United States Patent Office 3,583,991
Patented June 8, 1971

3,583,991
6-METHYL-8-PIPERAZINYL-METHYLERGALENE (ERGOLINE) DERIVATIVES
Franz Troxler and Albert Hofmann, Bottmingen, Switzerland, assignors to Sandoz Ltd., also known as Sandoz AG, Basel, Switzerland
No Drawing. Filed Jan. 13, 1969, Ser. No. 790,855
Claims priority, application Switzerland, Jan. 18, 1968, 783/68; Nov. 4, 1968, 16,390/68
Int. Cl. C07d 51/70
U.S. Cl. 260—268
19 Claims

ABSTRACT OF THE DISCLOSURE

New 6-methyl-8-piperazinyl-methylergolene and -methylergoline derivatives having central nervous system activity.

---

The present invention relates to new heterocyclic compounds of general Formula I,

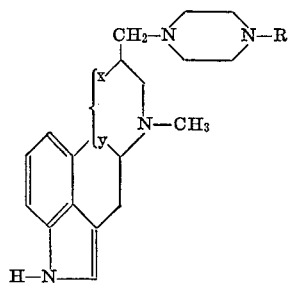

(I)

in which
$x\ y$ signifies the radical

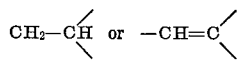

R signifies an aralkyl radical having 7 to 9 carbon atoms or an aryl radical, either of which may optionally have one or more of the substituents halogen, lower alkyl radical having 1 to 4 carbon atoms, lower alkoxy radical having 1 to 4 carbon atoms, amino or acylamino radical, the acyl radical of which is derived from an aliphatic carboxylic acid having 2 to 5 carbon atoms, or from an aromatic carboxylic acid, their acid addition salts and processes for their production.

In accordance with the invention (a) compounds of general Formula I are obtained by reduction of compounds of general Formula II,

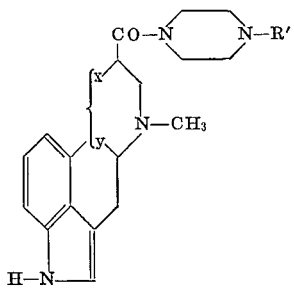

(II)

in which
$x\ y$ has the above significance, and
R' signifies an aralkyl radical having 7 to 9 carbon atoms or an aryl radical, either of which may optionally have one or more of the substituents halogen, lower alkyl radical having 1 to 4 carbon atoms, lower alkoxy radical having 1 to 4 carbon atoms or amino radical, the amino radical optionally carrying a protective radical, with a selective carbonyl to methylene reducing agent, in a solvent or solvent mixture which is inert under the reaction conditions, or
(b) Compounds of general Formula Ia,

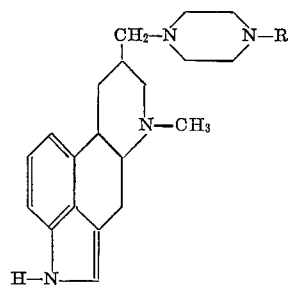

(Ia)

in which R has the above significance, are obtained by catalytic hydrogenation of compounds of general Formula Ib,

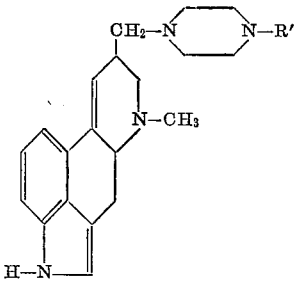

(Ib)

in which R' has the above significance, in a solvent or solvent mixture which is inert under the reaction conditions.

Splitting off any protective radical present after either of the above reductions from the resulting compounds having amino radicals, and optionally acylating the resulting amino compounds with a functional, reactive derivative of an aliphatic carboxylic acid having 2 to 5 carbon atoms, or of an aromatic carboxylic acid.

And optionally converting the resulting compounds of general Formula I into their acid addition salts.

The aralkyl radical having 7 to 9 carbon atoms may be, for example, an unsubstituted or an appropriately substituted benzyl, phenylethyl, phenylpropyl or phenylbutyl radical, and the aryl radical may be, for example, an unsubstituted or an appropriately substituted phenyl or naphthyl radical.

Cyclic or open-chain ethers, such as tetrahydrofuran, dioxane, diethyl ether, diglyme or dibutyl ether, are preferably used as solvents which are inert under the reaction conditions for the reduction with a selective carbonyl to methylene reducing agent. Reducing agents which may be used as selective carbonyl to methylene reducing agents include sodium aluminium hydride, diborane and preferably lithium aluminium hydride. This reduction is preferably effected at temperatures between about 0° and 80° C. and using about 1 to 10 mols of reducing agent for every mol of the compound of general Formula II. The reaction period ranges from about 15 minutes to two hours, depending on the reaction temperature. The decomposition of the reaction complex and the working up of the reaction mixture are effected in manner known per se; thus, for example, the reaction complex may be decomposed with ethyl acetate. Advantageously, however, the reaction mixture is decomposed with a slight excess of water. After removing the aluminium hydroxide thus formed the reduction product may be isolated by extraction with a water-immiscible solvent which is inert under the extraction conditions, preferably methylene chloride.

The reduction with a selective carbonyl to methylene reducing agent and the catalytic reduction may be effected with compounds of general Formula II or Ib, respectively, in which the aryl or aralkyl radical has one or more amino radicals, in the form of the free amino compounds or in the form of amino compounds, the amino radical of which has a protective radical. The tosyl or the trityl radical may especially be used as protective radical. This protective radical which may be present is split off either during the reduction, e.g. the tosyl radical is removed by lithium aluminium hydride, or may be removed after the reduction as, for example, the trityle radical, which is not removed by lithium aluminium hydride but which may be removed in manner known per se, e.g. by the action of acids.

The reduction with lithium aluminium hydride may, for example, be effected as follows: A compound of general Formula II is added at room temperature, while stirring in an atmosphere of nitrogen, to a suspension of lithium aluminium hydride in tetrahydrofuran. The reaction mixture is subsequently stirred at an elevated temperature for about 1 to 2 hours, the reaction complex is decomposed with a slight excess of water while cooling and the precipitated metal hydroxides are filtered off. The aluminium hydroxide which has been filtered off is washed, the wash solution and the filtrate are combined, concentrated, and extracted with methylene chloride. The organic phase is washed, for example with a sodium carbonate solution and water, is dried over sodium sulphate, concentrated by evaporation and the residue is purified by crystallization.

The catalytic hydrogenation indicated in section b is preferably effected using a palladium catalyst, e.g. palladium on aluminium oxide or active charcoal or palladium chloride, at room temperature or at a slightly elevated temperature and at a pressure between normal pressure and about 81 atmospheres. Ethanol may, for example, be used as a solvent which is inert under the reaction conditions.

The hydrogenation may, for example, be effected as follows: The compound to be hydrogenated is dissolved in ethanol and hydrogenated in the presence of palladium on aluminium oxide as catalyst at room temperature and normal pressure. After the take up of hydrogen is complete the catalyst is filtered off and the resulting product is optionally purified in manner known per se, e.g. by crystallization.

The acylation of compounds of general Formula I having amino radicals may be effected before or after the catalytic hydrogenation, but only after the reduction with the selective carbonyl to methylene reducing agent, preferably with lithium aluminium hydride, since the acylamino radical would be affected during this reduction. The acylation may be effected with reactive, functional derivatives of aliphatic carboxylic acids having 2 to 5 carbon atoms, or of aromatic carboxylic acids, preferably acid chlorides or acid anhydrides, in the presence of basic condensation agents, preferably tertiary organic bases, for example pyridine, optionally in a solvent or solvent mixture which is inert under the reaction conditions. The working up of the reaction mixture is effected in manner known per se.

The compounds of general Formula I are usually crystalline compounds at room temperature and with strong organic or inorganic acids form stable salts which are often crystalline at room temperature. Suitable acids for salt formation are inter alia the inorganic acids hydrochloric acid, hydrobromic acid or sulphuric acid, and the organic acids oxalic, maleic, tartaric and methanesulphonic acid.

The compounds of general Formula II, used as starting materials, may be produced, for example, by condensation of lysergic acid chloride hydrochloride or 9,10-dihydrolysergic acid chloride hydrochloride with compounds of general Formula III,

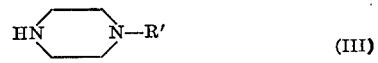

in which R' has the above significance.

This condensation is effected in a solvent or solvent mixture which is inert under the reaction conditions in the presence of a tertiary base, preferably pyridine, advantageously at a temperature between −20° and +10° C. The compounds of general Formula II derived from 9,10-dihydrolysergic acid may be produced by catalytic hydrogenation of the corresponding lysergic acid compounds. Palladium on aluminium oxide is preferably used as catalyst. The reaction may be effected at room temperature and normal pressure.

The compounds of Formula I are useful because they possess pharmacological activity in animals. In particular the compounds are useful as antidepressant and sedative agents affecting the central nervous system in mice and rats as indicated either by (a) their effect on DOPA induced fighting behavior, or by their tetrabenazine and reserpine antagonism, or (b) by their inhibition of locomotor activity and amphetamine induced excitation, or their barbiturate narcosis potentiation, or their inhibition of LSD and amphetamine induced stereotypy.

The stimulating, i.e. antidepressant, effect on the central nervous system is pronounced in the ergolene compounds and especially in the following compounds:

6-methyl-8β-(4-phenyl-1-piperazinyl)-methylergolene,
6-methyl-8β-(4-benzyl-1-piperazinyl)-methylergolene,
6-methyl-8β-[4-(p-methoxyphenyl)-1-piperazinyl]-methylergolene,
6-methyl-8β-[4-(o-chlorophenyl)-1-piperazinyl]-methylergolene,
6-methyl-8α-[4-(p-methoxyphenyl)-1-piperazinyl]-methylergolene,
6-methyl-8β-[4-(o-methoxyphenyl)-1-piperazinyl]-methylergolene,
6-methyl-8β-[4-(m-chlorophenyl)-1-piperazinyl]-methylergolene,
6-methyl-8β-[4-(p-chlorophenyl)-1-piperazinyl]-methylergolene,
6-methyl-8β-[4-(p-aminophenyl)-1-piperazinyl]-methylergolene,
6-methyl-8β-[4-(m-methoxyphenyl)-1-piperazinyl]-methylergolene.

For the above-mentioned stimulating, i.e. antidepressant, use, the dosage administered will, of course, vary depending upon the compound employed, mode of administration and treatment desired. However, in general satisfactory results are obtained when administered at a daily dosage of from about 0.3 milligrams to about 10 milligrams per kilogram of animal body weight, preferably given in divided doses 2 to 3 times a day or in sustained release form. For the larger mammals, the total daily dosage is in the range of from about 1 milligram to about 40 milligrams, and dosage forms suitable for oral administration comprise from about 0.5 to milligrams to about 5 milligrams of the compound admixed with a solid or liquid pharmaceutical carrier or diluent.

The sedative effect on the central nervous system is pronounced in the ergoline compounds and especially in the following compounds:

6-methyl-8β-[4-(o-chlorophenyl)-1-piperazinyl]-methylergoline
6-methyl-8β-[4-(p-methoxyphenyl)-1-piperazinyl]-methylergoline.

For the above-mentioned sedative use, the dosage administered will, of course, vary depending upon the compound employed, mode of administration and treatment desired. However, in general satisfactory results are obtained when administered at a daily dosage of from about 2 milligrams to about 100 milligrams per kilogram of animal body weight, preferably given in divided doses 2 to 3 times a day or in sustained release form. For the larger mammals, the total daily dosage is in the range of from about 10 milligrams to about 400 milligrams, and dosage forms suitable for oral administration comprise from about 5 milligrams to about 50 milligrams of the compound admixed with a solid or liquid pharmaceutical carrier or diluent.

Aside from the antidepressive effects indicated above 6 - methyl - 8β - [4-(p-methoxyphenyl)-1-piperazinyl] methylergolene is also useful as an antihypertensive agent, as indicated by the blood pressure lowering effect on hypertensive rats and dogs.

For the above-mentioned antihypertensive use, the dosage administered will, of course, vary depending upon the compound employed, mode of administration and treatment desired. However, in general satisfactory results are obtained when administered at a daily dosage of from about 0.02 milligrams to about 0.8 milligrams per kilogram of animal body weight, preferably given in divided doses 2 to 3 times a day or in sustained release form. For the larger mammals, the total daily dosage is in the range of from about 1 milligram to about 40 milligrams, and dosage forms suitable for oral administration comprise from about 0.5 milligram to about 5 milligrams of the compound admixed with a solid or liquid pharmaceutical carrier or diluent.

The new compounds and their pharmaceutically acceptable acid addition salts may be used as medicaments on their own or in the form of appropriate medicinal preparations for oral, enteral or parenteral administration. In oder to produce suitable medicinal preparations these compounds are worked up with pharmacologically inert adjuvants. Examples of such adjuvants are for tablets and dragées: lactose, starch, talc and stearic acid;
for injectable solutions: water, alcohols, glycerin and vegetable oils;
for suppositories: natural or hardened oils and waxes.

The preparations may furthermore contain suitable preserving, stabilizing and wetting agents, solubilizers, sweetening and coloring substances and flavourings.

The starting materials, the production of which is not described in the present application, are known or may be produced in manner known per se.

In the following examples which illustrate the process without in any way limiting the scope of the invention, all temperatures are indicated in degrees centigrade and are uncorrected.

EXAMPLE 1

6-methyl-8β-(4-phenyl-1-piperazinyl)methylergolene- (method *a*)

A solution produced at about 60° of 4.12 g. (0.01 mol) of d-lysergic acid N-phenylpiperazide in about 250 cc. of absolute tetrahydrofuran is rapidly cooled to room temperature and is added dropwise during the course of 10 minutes to a stirred suspension of 4 g. of lithium aluminium hydride in 25 cc. of absolute tetrahydrofuran at a temperature of the reaction mixture of about 10°. After stirring at room temperature for 1 hour the greenish suspension is decomposed by the careful addition of water while cooling with ice, is diluted with 200 cc. of a 2 N sodium carbonate solution and extracted thrice with 300 cc. amounts of methylene chloride. The combined organic phases are washed with water, dried over sodium sulphate and concentrated on a rotary evaporator at a bath temperature of about 60°. The crystalline residue is recrystallized thrice from methylene chloride/methanol after concentrating in a vacuum each time, giving lemon-yellow plates of the heading compound having a M.P. of 242–244° (decomp.), $[\alpha]_D^{20} = +75°$ (c.=1, methylene chloride containing 20% of methanol).

Di-methanesulphonate: Colourless needles from methylene chloride/methanol after subsequent concentration in a vacuum. M.P. 200–202° (decomp.), $[\alpha]_D^{20} = +64°$ (c.=2, water).

The d-lysergic acid N-phenylpiperazide used as starting material may be produced as follows:

10 cc. of N-phenylpiperazine are added to a suspension cooled to 0° of 5 g. of d-lysergic acid chloride hydrochloride in 200 cc. of methylene chloride, whereby the temperature rises to 10°. The reaction mixture is stirred at room temperature for a further hour and is subsequently shaken out between a sodium carbonate solution and chloroform. The organic phase is separated, dried over potash and after filtering off the drying agent is evaporated to dryness. The dry residue is mixed with ether and the ether-insoluble portion is chromatographed on 240 g. of silica gel, whereby d-lysergic acid N phenylpiperazide is washed into the filtrate with chloroform containing 1.5 to 2% of methanol. After removing the solvent the resulting d-lysergic acid N-phenylpiperazide is converted into its bimaleate by reacting with maleic acid in acetone.

Bimaleate: Needles from methanol, M.P. 200°, $[\alpha]_D^{20} = -20°$ (c.=0.5 in 50% alcohol). Keller's and Van Urk's colour reactions: blue.

EXAMPLE 2

6-methyl-8β-(4-phenyl-1-piperazinyl)methylergoline (method *a*)

A total of 15 g. of lithium aluminium hydride is added in small portions to a stirred suspension, cooled to 5°, of 15 g. (0.036 mols) of 9,10-dihydro-d-lysergic acid N-phenylpiperazide in 1:5 liters of absolute tetrahydrofuran. The reaction mixture is subsequently stirred at room temperature for a further 2 hours. After carefully decomposing the reaction mixture with a 100% excess of water, the precipitated hydroxide are filtered off. The filtrate is concentrated by evaporation in a vacuum, 1 liter of methylene chloride is added, washing is successively effected with a 2 N sodium carbonate solution and water, and the aqueous phases are again extracted with methylene chloride. After drying the combined organic phases over sodium sulphate and evaporating on a rotary evaporator, a crystalline crude base is obtained, which is obtained in pure form after recrystallizing thrice from methylene chloride/methanol. Colourless, microcrystalline powder, M.P. 256–258° (decomp.), $[\alpha]_D^{20} = -40°$ (c.=2, methylene chloride/methanol 7:3).

Bimaleate: Colourless needles from ethanol/methylene chloride after concentrating in a vacuum, M.P. 219–221° (decomp.), $[\alpha]_D^{20} = -41.6°$ (c.=2, ethanol/water 1:1).

The 9,10 - dihydro-d-lysergic acid N-phenylpiperazide used as starting material may be produced as follows:

21 g. of 9,10-dihydro-d-lysergic acid chloride hydrochloride are suspended in 150 cc. of absolute methylene chloride, the suspension is cooled to −15°, and a solution of 11.7 g. of N-phenylpiperazine in 10 cc. of absolute methylene chloride is added dropwise while stirring. After the addition of 10 cc. of absolute pyridine the temperature of the reaction mixture is adjusted to 0° with ice water and stirring is effected for half an hour, and the reaction mixture is then allowed to react at room temperature for two hours. 200 cc. of a 2 N sodium carbonate solution are added to the reaction mixture, the mixture is shaken out with a mixture of ethyl acetate and methylene chloride, the organic phase is dried over potassium carbonate, the drying agent is filtered off and the solvent mixture is evaporated. The residue is then chromatographed with methylene chloride/methanol on 250 g. of aluminium oxide and is subsequently crystallized from methylene chloride/ethanol. The resulting 9,10 - dihydro-d-lysergic acid N-phenylpiperazide has a M.P. of 261–263° (decomp.), $[\alpha]_D^{20} = -82.5°$ (c.=2, methylene chloride/ chloride/methanol 1:1).

Bitartrate: Needles from ethanol/water, M.P. 210–211° (decomp.), $[\alpha]_D^{20} = -65°$ (c.=1, dimethylsulphoxide).

EXAMPLE 3

6-methyl-8β-(4-benzyl-1-piperazinyl)methylergolene (method *a*)

4.26 g. (0.01 mol) of d-lysergic acid N-benzylpiperazide are added at room temperature in an atmosphere of nitrogen to a stirred suspension of 1.5 g. of lithium aluminum hydride in 300 cc. of absolute tetrahydrofuran. The mixture is subsequently stirred at 70° for a further 90 minutes and the turbid, greenish solution is carefully decomposed with about 50 cc. of water while cooling with ice. The hydroxides are filtered off and washed with methylene chloride containing 20% of methanol. The filtrate is concentrated in a rotary evaporator and worked up in a manner analogous to that described in Example 2.

The foam-like evaporation residue of the compound indicated in the heading is clairfied once by an active charcoal treatment in methylene chloride and after distilling off the solvent is crystallized from acetone. Pure, whitish, small plates, having a M.P. of 179–181° (decomp.), $[\alpha]_D^{20} = +43.2°$ (c.=1, chloroform), are obtained.

The d-lysergic acid N-benzylpiperazide used as starting material may be produced as follows:

A solution of 1.76 g. of N-benzylpiperazine in 5 cc. of absolute pyridine is slowly added dropwise while stirring to a suspension cooled to −15° of 3,23 g. (10 millimols) of d-lysergic acid chloride hydrochloride in 25 cc. of absolute methylene chloride. The reaction mixture is subsequently stirred at 0° for 30 minutes and finally at room temperature for 2 hours, working up is effected by adding 100 cc. of a 2 N sodium carbonate solution and shaking thoroughly in a separating funnel. The aqueous phase is extracted several times with methylene chloride and the combined organic phases are dried over sodium sulphate. After filtering and distilling off the solvent at reduced pressure at a bath temperature of 60°, the crude base, obtained in the form of a brown foam, is chromatographed on 200 g. of aluminium oxide of activity II–III. d-Lysergic acid N-benzylpiperazide is eluted with methylene chloride containing 0.3% of methanol, as a yellow foam which cannot be crystallized, the bimaleate of which has a M.P. of 165–168° (decomp.). $[\alpha]_D^{20} = +28.4°$ (c.=1, pyridine).

d-Isolysergic acid N-benzylpiperazide is obtained with 0.5% of methanol in methylene chloride, and likewise does not crystallize. $[\alpha]_D^{20} = +162°$ (c.=1, methylene chloride/methanol 1:1).

EXAMPLE 4

6-methyl-8α-[4-(p-methoxyphenyl)-1-piperazinyl]-methylergolene (method *a*)

The process is effected in a manner analogous to that described in Example 3, using 4.42 g. (0.01 mol) of d-isolysergic acid N-(p - methoxyphenyl)piperazide. The crude base is obtained, which is crystallized from benzene, and after drying in a high vacuum at 80° (2 hours) yields yellowish prisms having a M.P. of 128–132° (decomp.). $[\alpha]_D^{20} = +176°$ (c.=1, methylene chloride/methanol 1:1).

The di-Isolysergic acid N-(p-methoxyphenyl)piperazide used as starting material may be produced as follows:

A mixture of 10 cc. of absolute pyridine in 10 cc. of dimethylformamide is carefully added to a suspension cooled to −15° of 3.23 g. (10 millimols) of d-lysergic acid chloride hydrochloride in 15 cc. of absolute methylene chloride. Immediately thereafter 2.64 g. (10 millimols) of N-(p-methoxyphenyl)piperazine dihydrochloride are added at 0°. The reaction mixture is stirred at room temperature in the dark for 2 hours, working up is effected by covering with a layer of 100 cc. of a 2 N sodium carbonate solution and shaking thoroughly in a separating funnel. The aqueous phase is extracted several times with methylene chloride containing 10% of methanol and the combined organic phases are dried over sodium sulphate. The solution is concentrated by evaporation at reduced pressure at a bath temperature of 60° and the resulting mixture of crude bases is chromatographed on a 50-fold quantity of aluminium oxide with methylene chloride containing 0.6% of methanol. d-lysergic acid N-(p-methoxyphenyl)piperazide is obtained in the form of a resin, the bimaleate of which has a M.P. of 185–187° with decomposition and $[\alpha]_D^{20} = -22.8$ (c.=1, methylene chloride/methanol 1:1).

d-Isolysergic acid N-(p - methoxyphenyl)piperazide is eluted with methylene chloride containing 0.8% of methanol and after crystallization from methanol has a M.P. of 224–226° (decomp.). $[\alpha]_D^{20} = +190°$ (c.=1, methylene chloride).

EXAMPLE 5

6-methyl-8β-[4-(p-methoxyphenyl)-1-piperazinyl]-methylergolene (method *a*)

The process is effected in a manner analogous to that described in Example 3, using 4.42 g. (0.01 mol) of d-lysergic acid N-(p-methoxyphenyl)piperazide. After taking up the crystalline crude base in methylene chloride/methanol and subsequently concentrating by evaporation in a vacuum, the compound indicated in the heading is obtained as yellowish crystals having a M.P. of 198–201° (decomp.). $[\alpha]_D^{20} = +93°$ (c.=0.5, methylene chloride/methanol 1:1).

Di-methanesulphonate: From methylene chloride/ethanol after concentrating in a vacuum small plates having a M.P. of 245° (decomp.). $[\alpha]_D^{20} = +70.5°$ (c.=0.5, methylene chloride/methanol 1:1).

The production of d-lysergic acid N-(p-methoxyphenyl)piperazide used as starting material is described in the production of the starting materials in Example 4.

EXAMPLE 6

6-methyl-8β-[4-(o-chlorophenyl)-1-piperazinyl]-methylergolene (method *a*)

The process is effected in a manner analogous to that described in Example 3, using 4.48 g. (0.01 mol) of d-lysergic acid N-(o-chlorophenyl)piperazide. The powdery residue obtained after working up is crystallized from ethyl acetate and yields the compound indicated in the heading in the form of yellowish leaflets having a M.P. of 230–250° (decomp.). $[\alpha]_D^{20} = +49°$ (c.=0.17, methylene chloride/methanol 1:1).

The d-lysergic acid N-(o-chlorophenyl)piperazide used as starting material may be produced as follows:

3.23 g. (10 millimols) of d-lysergic acid chloride hydrochloride are reacted with 2.68 g. (10 millimols) of N-(o-chlorophenyl)piperazine dihydrochloride in a manner analogous to the process for the production of the starting materials described in Example 4, and the reaction mixture is worked up as described in said example. d-Lysergic acid N-(o-chlorophenyl)piperazide crystallizes from ethanol. M.P. 176–178° (decomp.), $[\alpha]_D^{20} = +27.1°$ (c.=1, methylene chloride/methanol 1:1).

Bimaleate: From methylene chloride/methanol after concentrating in a vacuum. M.P. 208–210° (decomp.), $[\alpha]_D^{20} = -25.6°$ (c.=1, methylene chloride).

d-Isolysergic acid N-(o-chlorophenyl) piperazide is amorphous. $[\alpha]_D^{20} \geq +140°$ (c.=1, methylene chloride).

EXAMPLE 7

6-methyl-8β-[4-(o-methoxyphenyl)-1-piperazinyl]-methylergolene (method *a*)

The process is effected in a manner analogous to that described in Example 3, using 4.48 g. (0.01 mol) of d-lysergic acid N-(o-methoxyphenyl)piperazide. After working up the reaction mixture the residue is dissolved in methylene chloride/methanol and concentrated in a vacuum, whereby crystallization commences. The pure compound indicated in the heading is obtained in the form of leaflets. M.P. 225–230° (decomp.), $[\alpha]_D^{20} = +46.6°$ (c.=1, methylene chloride/methanol 1:1).

An additional amount of pure base may be obtained from the mother liquor residue by chromatography on a 50-fold quantity of aluminum oxide of activity II–III with 0.5% of methanol in methylene chloride as eluant.

The d-lysergic acid N-(o-methoxyphenyl)piperazide used as starting material may be produced as follows:

3.23 g. (10 millimols) of d-lysergic acid chloride hydrochloride are reacted with 2.64 g. (10 millimols) of N-(o-methoxyphenyl)piperazine dihydrochloride in a manner analogous to the process for the production of the starting materials described in Example 4, and the mixture of crude bases is isolated.

The mixture of crude bases is chromatographed on a 50-fold quantity of aluminium oxide of activity II–III, whereby d-lysergic acid N-(o-methoxyphenyl)piperazide is eluted with methylene chloride containing 0.4% of methanol. M.P. 138–143° (decomp.) (from ethanol), $[\alpha]_D^{20} = +28.8°$ (c.=1, methylene chloride/methanol 1:1).

Bimaleate: From ethanol/methylene chloride after concentrating the solution in a vacuum. M.P. 199–202° (decomp.), $[\alpha]_D^{20} = -24.9°$ (c.=1, methylene chloride/methanol 1:1).

d-Isolysergic acid N-(o-methoxyphenyl)piperazide is washed from the column with methylene chloride containing 0.6% of methanol and is obtained in the form of a yellowish resin. $[\alpha]_D^{20} = +220°$ (c.=1, methylene chloride).

EXAMPLE 8

6-methyl-8β-[4-(p-methoxyphenyl)-1-piperazinyl]-methylergoline (method b)

4.28 g. (0.01 mol) of 6-methyl-8β-[4-(p-methoxyphenyl)-1-piperazinyl]methylergolene are dissolved in 100 cc. of absolute ethanol with the addition of a small amount of methylene chloride and the solution is hydrogenated on 4 g. of palladium on aluminum oxide (5% Pd) at room temperature and normal pressure. After 4 hours the taking up of hydrogen stops. The catalyst is filtered off, washing is effected with methylene chloride/methanol (1:1), the solution is concentrated in a vacuum, whereby crystallization soon commences. The compound of the heading is obtained pure. M.P. 257–261° (decomp.), $[\alpha]_D^{20} = -64°$ (c.=1, pyridine).

EXAMPLE 9

6-methyl-8β-[4-p-methoxyphenyl)-1-piperazinyl]-methylergoline (method a)

The process is effected in a manner analogous to that described in Example 3, using 4.50 g. (0.01 mol) of 9,10-dihydro-d-lysergic acid N-(p-methoxyphenyl)piperazide. The residue obtained after working up is dissolved in methylene chloride with the addition of methanol, filtration and concentration in a vacuum are effected. The pure compound indicated in the heading is obtained. M.P. 258–261° (decomp.), $[\alpha]_D^{20} = -64.2°$ (c.=1, pyridine).

The 9,10-dihydro-d-lysergic acid N-(p-methoxyphenyl)piperazide used as starting material may, for example, be obtained as follows:

10 cc. of absolute pyridine are carefully added at −15° to a stirred suspension of 3.25 g. (0.01 mol) of 9,10-dihydro-d-lysergic acid chloride hydrochloride in 30 cc. of absolute methylene chloride and subsequently 1.92 g. (0.01 mol) of N-(p-methoxyphenyl)piperazine in 5 cc. of absolute methylene chloride are added. The mixture is allowed to react at 0° for 1 hour and at room temperature for a further 2 hours and the reaction mixture is poured into 100 cc. of a 2 N sodium carbonate solution. After extracting thrice with 100 cc. amounts of methylene chloride containing 10% of methanol, drying the combined organic phases over sodium sulphate and distilling off the solvent, a partially crystalline residue is obtained, which is dissolved in a mixture of methylene chloride/ethanol and after concentrating is again made to crystallize. 9,10-dihydro-d-lysergic acid N-(p-methoxyphenyl)piperazide is thus obtained in practically pure form. M.P. 212–217° (decomp.), $[\alpha]_D^{20} = -80°$ (c.=1, methanol/methylene chloride 1:1).

EXAMPLE 10

6-methyl-8β-[4-(o-chlorophenyl)-1-piperazinyl]-methylergoline (method a)

The process is effected in a manner analogous to that described in Example 3, using 4.48 g. of 9,10-dihydro-d-lysergic acid N-(o-chlorophenyl)piperazide. After working up a crystalline crude base is obtained, which is taken up in methylene chloride/ethanol and is concentrated in a vacuum, yielding the pure compound indicated in the heading. Decompostion point 260–265°, $[\alpha]_D^{20} = -63°$ (c.=1, pyridine).

The 9,10-dihydrolysergic acid N-(o-chlorophenyl) piperazide, used as starting material, is produced in a manner analogous to that described in Example 9 for the production of 9,10-dihydro-d-lysergice acid N-(p-methoxyphenyl)piperazide, using 1.96 g. (0.01 mol) of N-(o-chlorophenyl)piperazine. The starting material is obtained in pure crystalline form after the same working up. M.P. 218–220° (decomp.), $[\alpha]_D^{20} = -108°$ (c.=1, pyridine).

EXAMPLE 11

6-methyl-8β-[4-(m-chlorophenyl)-1-piperazinyl]-methylergolene (method a)

The process is effected in a manner analogous to that described in Example 3, using 4.46 g. (0.01 mol) of d-lysergic acid N-(m-chlorophenyl)piperazide. The crystalline residue obtained after working up is taken up in ethanol, filtration is effected and after taking up again in methylene chloride/methanol is concentrated in a vacuum. The pure title compound is obtained in this manner. Decomposition point 228–232°, $[\alpha]_D^{20} = +67.5°$ (c.=1, methanol/methylene chloride 1:1).

The d-lysergic acid N-(m-chlorophenyl)piperazide, used as starting material, may be obtained in a manner analogous to the process for the production of the starting materials described in Example 4:

3.23 g. (0.01 mol) of d-lysergic acid chloride hydrochloride are reacted with 2.68 g. of 1-(m-chlorophenyl) piperazine dihydrochloride and the mixture of crude bases is chromatographed on a 50-fold quantity of aluminium oxide of activity II–III. d-Lysergic aci d N-m-chlorophenyl)piperazide is eluted with 0.2% of methanol in methylene chloride and crystallizes from ethanol. M.P. 228–232° (decom.), $[\alpha]_D^{20} = +34.5°$ (c.=1, methanol/methylene chloride 1:1).

d-Isolysergic acid N-(m-chlorophenyl)piperazide is eluted with 0.4% of methanol in methylene chloride. It crystallizes from ethanol. M.P. 125–130° (decomp.), $[\alpha]_D^{20} = +182.5°$ (c.=1, methanol/methylene chloride 1:1).

EXAMPLE 12

6-methyl-8β-[4-(p-chlorophenyl)-1-piperazinyl]-methylergolene (method a)

The process is effected in a manner analogous to that described in Example 3, using 4.46 g. (0.01 mol) of d-lysergic acid N-(p-chlorophenyl)piperazide. The crystalline crude base is taken up in methanol, filtered, and recrystallized from methylene chloride/methanol as described above. M.P. 229–232°, $[\alpha]_D^{20} = +43.5°$ (c.=1, pyridine).

The d-lysergic acid N-(p-chlorophenyl)piperazide, used as starting material, may be obtained in a manner analogous to the process described in Example 4:

1.96 g. (0.01 mol) of 1-(p-chlorophenyl)piperazide, are used. d-Isolysergic acid N-(p-chlorophenyl)piperazide is exceedingly difficultly soluble and crystallizes with a sufficient degree of purity during the distilling of the dried organic extract. M.P. 273–277° (decomp.), $[\alpha]_D^{20} = +168°$ (c.=1, dimethyl sulphoxide).

After distilling off the solvent the filtrate is chromatographed on a 50-fold quantity of aluminium oxide of activity II–III. d-lysergic acid N-(p-chlorophenyl)piperazide is eluted with 0.5% of methanol in methylene chloride and crystallized from methanol. M.P. 175–177° (decomp.), $[\alpha]_D^{20} = +21°$ (c.=1, methylene chloride).

EXAMPLE 13

6-methyl-8β-[4-(2,5-dimethoxyphenyl)-1-piperazinyl]-methylergolene (method a)

The process is effected in a manner analogous to that described in Example 2, using 4.72 g. of d-lysergic acid N-(2,5-dimethoxyphenyl)piperazide. It is advantageous to convert the crude base immediately into the bitartrate by taking up in methylene chloride/ethanol, adding the theoretical amount of D-tartaric acid and concentrating by evaporation in a vacuum. M.P. 160°, indefinite (decomp.), $[\alpha]_D^{20} = +35°$ (c.=1, pyridine).

The d-lysergic acid N-(2,5-dimethoxyphenyl)piperazide, used as starting material, is produced in accordance with the process described in Example 4:

2.22 g. (0.01 mol) of 1-(2,5-dimethoxyphenyl)piperazine are used. The crude base is chromatographed on a 60-fold quantity of aluminium oxide of activity II–III, whereby d-lysergic acid N-(2,5-dimethoxyphenyl)piperazide is eluted with methylene chloride containing 0.1% of methanol, to give a resin which does not crystallize. Bitartrate: From methanol/ether, M.P. 159–163° (decomp.), $[\alpha]_D^{20} = +1°$ (c.=1, methylene chloride/methanol 1:1).

d-Isolysergic acid N-(2,5-dimethoxyphenyl)piperazide likewise cannot be crystallized. $[\alpha]_D^{20}$ of an about 96% resinous crude product: +156° (c.=1, methanol/methylene chloride 1:1).

EXAMPLE 14

6-methyl-8β-[4-(o-tolyl)-1-piperazinyl]methylergolene (method a)

The process is effected in a manner analogous to that described in Example 3, using 4.34 g. (0.01 mol) of d-lysergic acid N-(o-tolyl)piperazide. The crude base is taken up in methylene chloride/ethanol and crystallizes upon concentrating in a vacuum. M.P. 161–163° (decomp.), $[\alpha]_D^{20} = +35.5°$ (c.=1, ethanol/chloroform 1:1).

The d-lysergic acid N-(o-tolyl)piperazide, used as starting material, is produced in accordance with the process described in Example 4:

2.48 g. (0.01 mol) of 1-(o-tolyl)piperazine dihydrochloride are used. The product crystallizes from methanol. M.P. 161–166° (decomp.), $[\alpha]_D^{20} = +34°$ (c.=1, methylene chloride/methanol 1:1).

d-Isolysergic acid -N-(o-tolyl)piperazide, which in a manner analogous to the product mentioned above is washed from the column with 0.2% of methanol, crystallizes from ethanol. M.P. 219–221° (decomp.), $$[\alpha]_D^{20} = +186°$$

(c.=1, methylene chloride/methanol 1:1).

EXAMPLE 15

6-methyl-8α-[4-(p-benzoylaminophenyl)-1-piperazinyl]-methylergolene (method a)

The process is effected in a manner analogous to that described in Example 2, using 6.69 g. of d-isolysergic acid N-(p-tritylaminophenyl)piperazide. The light beige foam obtained after working up mainly consists of 6-methyl-8α-[4-(p - tritylaminophenyl) - 1 - piperazinyl] methylergolene which is chromatographed on a 50-fold quantity of aluminium oxide of activity II–III. The compound is obtained in pure form with 0.1% of methanol in methylene chloride. The compound is dissolved at room temperature in 20 cc. of trifluoroacetic acid, the solution is allowed to stand for 1 hour and is diluted with 100 cc. of water. The solution is made strongly alkaline with potassium carbonate and is extracted with methylene chloride until a sample of the same gives a negative Keller reaction. After drying over sodium sulphate the solvent is distilled off and the resulting foam is dissolved in 30 cc. of absolute pyridine. After adding 1.5 equivalents of benzoyl chloride and allowing to stand over night at room temperature, the mixture is poured into 200 cc. of a 2 N sodium carbonate solution and is again extracted with methylene chloride until a negative Keller reaction is obtained. After drying over sodium sulphate and distilling off the solvent in a vacuum, the resulting crude product is chromatographed on a 50-fold quantity of aluminium oxide of activity II–III. The reaction products resulting during the splitting off of the trityl radical are removed with methylene chloride as eluant, whereas the title compound is obtained with 0.1 to 0.2% of methanol in methylene chloride. $[\alpha]_D^{20} = +165°$ (c.=1, methylene chloride).

Bimaleate: M.P. 130–133° (decomp.).—The d-isolysergic acid N-(p-tritylaminophenyl)piperazide, used as starting material, may be obtained as follows:

4.2 g. (0.02 mols) of trifluoroacetic acid anhydride are rapidly added dropwise to a suspension cooled to −15° of 5.56 g. (0.02 mols) of d-lysergic acid in 40 cc. of absolute acetonitrile. 10 cc. of absolute triethylamine and 4.21 g. (0.01 mol) of 4-(p-tritylaminophenyl)piperazine in 15 cc. of absolute acetonitrile are successively added to the resulting clear solution and the mixture is stirred at 10° for 2 hours. Working up is effected by pouring the reaction mixture into 200 cc. of 2 N sodium carbonate and extracting thrice with 500 cc. amounts of methylene chloride. After drying over sodium sulphate and distilling off the solvent a brown foam is obtained which mainly consists of d-isolysergic acid N-(p-tritylaminophenyl)piperazide. For purposes of purification the crude product is chromatographed on a 50-fold quantity of aluminum oxide, whereby aside from impurities d-lysergic acid N-(p-tritylaminophenyl)piperazide is eluted with 0.2% of methanol in methylene chloride and d-isolysergic acid N-(p-tritylaminophenyl)piperazide is eluted with 0.3 to 0.4% of methanol in methylene chloride.

4-(p-tritylaminophenyl)piperazine may be produced as follows:

2.51 g. (0.01 mol) of 1-carbethoxy-4-(p-aminophenyl) piperazine are dissolved in 20 cc. of absolute pyridine, 2.78 g. of trityl chloride are added and the mixture is heated at reflux for 2 hours. The mixture is subsequently poured into 200 cc. of a 2 N sodium carbonate solution, is extracted thrice with 200 cc. amounts of methylene chloride and after drying over sodium sulphate the solvent is removed. The resulting residue is chromatographed on a 20-fold quantity of aluminum oxide of activity II–III with methylene chloride as eluant, whereby the tritylated compound indicating an $R_f$ value of 0.5 to 0.6 in the thin layer chromatogram (silica gel G, 5% of methanol in methylene chloride) is produced.

The 1 - carbethoxy-4-(p - tritylaminophenyl)piperazine obtained in this manner is dissolved in 150 cc. of methanol, 20 g. of caustic potash, 5 cc. of dimethyl sulphoxide and 5 cc. of water are added and the mixture is heated at reflux for 20 hours. After pouring the reaction mixture into 200 cc. of a 4 N potassium carbonate solution extraction is effected 4 times with 100 cc. amounts of ether, drying is effected over sodium sulphate and the solvent is removed in a vacuum. The resulting residue is chromatographed on a 20-fold quantity of aluminum oxide of activity II–III, whereby the first 200 cc. of eluate are discarded. The resulting crude 4-(p-tritylaminophenyl)piperazine may be used as such for the condensation with d-lysergic acid.

EXAMPLE 16

6-methyl-8β-[4-(p-aminophenyl)-1-piperazinyl] methylergolene (method a)

4.27 g. (0.01 mol) of d-lysergic acid N-(p-aminophenyl)piperazide are added to a stirred suspension of 1.5 g. of lithium aluminum hydride in 300 cc. of absolute tetrahydrofuran at room temperature and in an atmosphere of nitrogen. After heating at reflux for 3 hours the reaction mixture is carefully decomposed with about 5 cc. of water, is filtered, the precipitate is washed well with methanol/methylene chloride (1:1), the filtrate is dried over sodium sulphate and the solvent is removed in a vacuum. The resulting crude base is chromatographed on a 100-fold quantity of silica gel, whereby the title compound is eluted with 8% of methanol in methylene chloride immediately after unconverted starting material. After concentrating the pure fraction by evaporation a crystalline powder having a M.P. of 196–203° (decomp.), $[\alpha]_D^{20}=+66°$ (c.=1, methylene chloride/methanol 1:1), is obtained.

The d-lysergic acid N-(p-aminophenyl)piperazide used as starting material is obtained, for example, as follows:

(1) d-Lysergic acid N-(p-nitrophenyl)piperazide.—A mixture of 10 cc. of absolute pyridine in 10 cc. of dimethyl formamide is carefully added to a suspension cooled to −15° of 3.23 g. (10 millimols) of d-lysergic acid chloride hydrochloride in 15 cc. of absolute methylene chloride. Immediately thereafter 2.64 g. (10 millimols) of N-(p-nitrophenyl)piperazine are added at 0°. The reaction mixture is stirred at room temperature in the dark for 2 hours, is then worked up by covering with a layer of 100 cc. of a 2 N sodium carbonate solution and is shaken thoroughly in a separating funnel. The aqueous phase is extracted several times with methylene chloride containing 10% of methanol and the combined organic phases are dried over sodium sulphate. The solution is concentrated by evaporation at a bath temperature of 60° and at reduced pressure. The crude base is chromatographed on a 50-fold quantity of aluminium oxide of activity II–III, whereby d-lysergic acid N-(p-nitrophenyl)piperazine is eluted with 0.2% of methanol in methylene chloride. The pure fractions may be crystallized from methanol/ethyl acetate. M.P. 213–217° (decomp.), $[\alpha]_D^{20}=-13.4°$ (c.=1, dimethyl formamide).

(2) d-Lysergic acid N-(p-aminophenyl)piperazide.—3 g. of tin-II-chloride are suspended in 6 cc. of glacial acetic acid, the suspension is saturated with hydrochloric acid gas while cooling and stirring and is diluted with glacial acetic acid to a total volume of 10 cc. 1 g. of d-lysergic acid p-(nitrophenyl)piperazide is then added, the mixture is stirred at room temperature for 20 hours and subsequently at 50° for 3 hours. Working up is effected by decomposing the reaction mixture with 40 cc. of a 20% aqueous caustic soda solution and extracting 4 times with 100 cc. amounts of methylene chloride containing 10% of methanol. After concentrating the dried extract by evaporation the residue is chromatographed on a 50-fold quantity of aluminium oxide of activity II–III. The pure base is eluted with 0.3% of methanol in methylene chloride and crystallizes from methylene chloride/ethyl acetate. M.P. 244–246° (decomp.), $[\alpha]_D^{20}=+11°$ (c.=1, pyridine).

6-methyl-8β-[4-(m-methoxyphenyl)-1-piperazinyl] methylergolene (method a)

This compound is obtained in a manner analogous to that described in Example 16, using 4.42 g. (0.01 mol) of d-lysergic acid N-(m-methoxyphenyl)piperazide and crystallizing the crude base from ethanol. After recrystallizing once from ethanol/methylene chloride and subsequently concentrating in a vacuum the title compound is pure. M.P. 230–235° (decomp.), $[\alpha]_D^{20}=+66°$ (c.=1, 2 N hydrochloric acid).

The d-lysergic acid N-(methoxyphenyl)piperazide, used as starting material, is produced in accordance with the process indicated in Example 16, section 1, using 1.92 g. (0.01 mol) of N-(m-methoxyphenyl)piperazine. The crude base is chromatographed on a 50-fold quantity of aluminium oxide of activity II–III, whereby the desired compound is eluted as a resin with 0.2% of methanol in methylene chloride.

Bimaleate: From ethanol, M.P. 197–201° (decomp.), $[\alpha]_D^{20}=-17°$ (c.=1, methylene chloride/methanol 1:1).

EXAMPLE 18

6-methyl-8β-[4-(3,4-dimethoxyphenyl)-1-piperazinyl]methylergolene (method a)

This compound is obtained in a manner analogous to that described in Example 16, using 4.72 g. (0.01 mol) of d-lysergic acid N-(3,4 - dimethoxyphenyl)piperazide. The title compound is obtained in pure form by dissolving crude base in ethanol/methylene chloride and subsequent crystallization by concentrating in a vacuum. M.P. 212–214° (decomp.), $[\alpha]_D^{20}=+63°$ (c.=1, methanol/methylene chloride 1:1).

The d-lysergic acid N-(3,4-dimethoxyphenyl)piperazide, used as starting material, is produced in accordance with the process indicated in Example 16, section 1), using 2.22 g. (0.01 mol) of N-(3,4-dimethoxyphenyl)piperazine. The crude base is chromatographed on a 50-fold quantity of aluminium oxide of activity II–III, whereby the desired compound is eluted as a resin, which is not crystalline, with 0.2% of methanol in methylene chloride.

Bimaleate: From ethanol, M.P. 204–206° (decomp.), $[\alpha]_D^{20}=-30°$ (c.=1, methylene chloride/methanol 1:1).

EXAMPLE 19

6-methyl-8β-[4-(p-tolyl)-1-piperazinyl] methylergolene (method a)

This compound is obtained in a manner analogous to that described in Example 16, using 4.32 g. (0.01 mol) of d-lysergic acid N-(p-tolyl)piperazide and crystallizing the crude base from ethanol or chloroform, M.P. 233–235° (decomp.), $[\alpha]_D^{20}=+60°$ (c.=1, ethanol/chloroform 1:1).

Dimethane sulphonate: From chloroform/ethanol and taking up the evaporation residue in acetone. M.P. 247–248° (decomp.), $[\alpha]_D^{20}=+55°$ (c.=1, water).

The d-lysergic acid N-(p-tolyl)piperazide, used as starting material, is produced in a manner analogous to that described in Example 16, section 1. 1.76 g. (0.01 mol) o fN-(p-tolyl)piperazine is used as starting material. The crude base is chromatographed on a 50-fold quantity of aluminium oxide of activity II–III, whereby the desired compound is eluted with 0.2% of methanol in methylene chloride. After concentrating by evaporation the fractions which are pure in accordance with thin layer chromatography are immediately used for the subsequent reaction.

Bimaleate: From ethylene chloride/ethanol after concentrating the solution. M.P. 145° (decomp.), $[\alpha]_D^{20}=-17°$ (c.=1, methanol/methylene chloride 1:1).

What is claimed is:

1. A compound of the formula

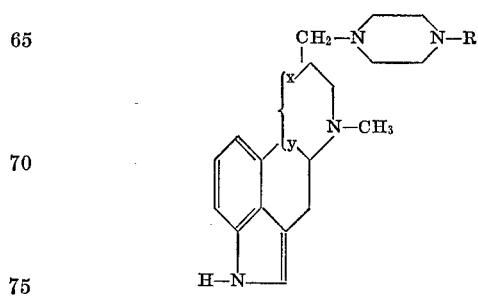

in which $\overset{\frown}{x\ y}$ is

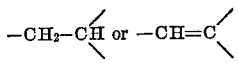

R is benzyl, phenyl, halophenyl, alkylphenyl having 1 to 4 carbon atoms in the alkyl moiety, alkoxyphenyl having 1 to 4 carbon atoms in the alkoxy moiety, aminophenyl, benzoylaminophenyl or dialkoxyphenyl each alkoxy moiety having 1 to 4 carbon atoms, or a pharmaceutically acceptable acid addition salt thereof.

2. A compound as claimed in claim 1, which is 6-methyl-8β-(4-phenyl-1-piperazinyl)methylergolene or a pharmaceutically acceptable acid addition salt thereof.

3. A compound as claimed in claim 1, which is 6-methyl-8β-(4-phenyl-1-piperazinyl)methylergolene or a pharmaceutically acceptable acid addition salt thereof.

4. A compound as claimed in claim 1, which is 6-methyl-8β-(4-benzyl-1-piperazinyl)methylergolene or a pharmaceutically acceptable acid addition salt thereof.

5. A compound as claimed in claim 1, which is 6-methyl-8α-[4-(p-methoxyphenyl) - 1 - piperazinyl]methylergolene or a pharmaceutically acceptable acid addition salt thereof.

6. A compound as claimed in claim 1, which is 6-methyl-8β-[4-(p-methoxyphenyl) - 1 - piperazinyl]methylergolene or a pharmaceutically acceptable acid addition salt thereof.

7. A compound as claimed in claim 1, which is 6-methyl-8β-[4-(o-chlorophenyl) - 1 - piperazinyl]methylergolene or a pharmaceutically acceptable acid addition salt thereof.

8. A compound as claimed in claim 1, which is 6-methyl-8β-[4-(o-chlorophenyl) - 1 - piperazinyl]methylergolene or a pharmaceutically acceptable acid addition salt thereof.

9. A compound as claimed in claim 1, which is 6-methyl-8β-[4-(p-methoxyphenyl) - 1 - piperazinyl]methylergolene or a pharmaceutically acceptable acid addition salt thereof.

10. A compound as claimed in claim 1, which is 6-methyl-8β-[4-(o-chlorophenyl) - 1 - piperazinyl]methylergoline or a pharmaceutically acceptable acid addition salt thereof.

11. A compound as claimed in claim 1, which is 6-methyl-β-[4-(m-chlorophenyl) - 1 - piperazinyl]methylergolene or a pharmaceutically acceptable acid addition salt thereof.

12. A compound as claimed in claim 1, which is 6-methyl-β-[4-(p-chlorophenyl) - 1 - piperazinyl]methylergolene or a pharmaceutically acceptable acid addition salt thereof.

13. A compound as claimed in claim 1, which is 6-methyl-8β-[4-(2,5 - dimethoxyphenyl)-1-piperazinyl]methylergolene or a pharmaceutically acceptable acid addition salt thereof.

14. A compound as claimed in claim 1, which is 6-methyl-8β-[4-(o-tolyl)-1-piperazinyl]methylergolene or a pharmaceutically acceptable acid addition salt thereof.

15. A compound as claimed in claim 1, which is 6-methyl-8α-[4-(p - benzoylaminophenyl)-1-piperazinyl]methylergolene or a pharmaceutically acceptable acid addition salt thereof.

16. A compound as claimed in claim 1, which is 6-methyl-8β-[4-(p - aminophenyl)-1-piperazinyl]methylergolene or a pharmaceutically acceptable acid addition salt thereof.

17. A compound as claimed in claim 1, which is 6-methyl-8β-[4-(m - methoxyphenyl)-1-piperazinyl]methylergolene or a pharmaceutically acceptable acid addition salt thereof.

18. A compound as claimed in claim 1, which is 6-methyl-8β-[4-(3,4 - dimethoxyphenyl)-1-piperazinyl]methylergolene or a pharmaceutically acceptable acid addition salt thereof.

19. A compound as claimed in claim 1, which is 6-methyl-8β-[4-(p-tolyl)-1-piperazinyl]methylergolene or a pharmaceutically acceptable acid addition salt thereof.

References Cited

UNITED STATES PATENTS 2,997,420  8/1961  Pioch _____ 262—268X

FOREIGN PATENTS 375,364  4/1964  Switzerland _____ 260—285.5
1,510,553  12/1967  France _____ 260—268

D. G. DAVIS, Primary Examiner

U.S. Cl. X.R.

260—285.5, 690; 424—261